Feb. 14, 1950   J. R. SUTHERLAND   2,497,699
PROTECTIVE CIRCUIT FOR ELECTRICAL WINDINGS
Filed June 30, 1949
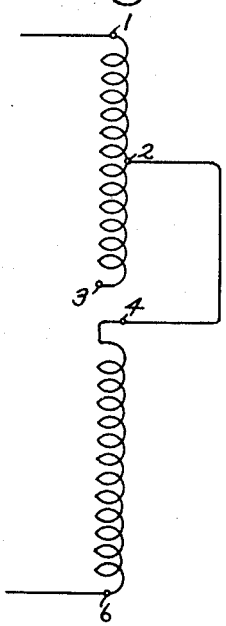
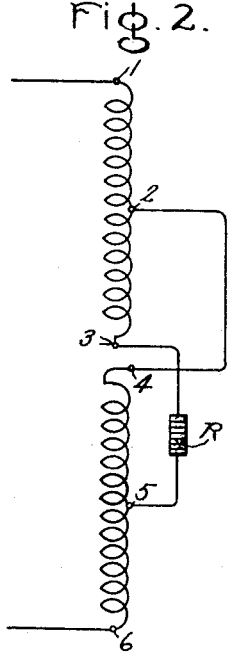
Inventor:
James R. Sutherland,
by Ernest C. Britton
His Attorney.

Patented Feb. 14, 1950

2,497,699

UNITED STATES PATENT OFFICE 2,497,699

PROTECTIVE CIRCUIT FOR ELECTRICAL WINDINGS

James R. Sutherland, New Lebanon, N. Y., assignor to General Electric Company, a corporation of New York Application June 30, 1949, Serial No. 102,211

2 Claims. (Cl. 175—294)

My invention relates to electrical induction apparatus, and more particularly to a protective circuit for the windings of such apparatus.

In electrical induction apparatus of the type having a plurality of winding sections, it frequently happens that there are physically adjacent points of adjoining winding sections which are not directly connected together electrically although one of these two adjacent points may be connected to a third point which is in electrical relation with the other of the two adjacent points. Such a situation may prevail, for example, in certain autotransformer circuits.

When a transient voltage of a sufficiently high magnitude is impressed upon such a winding it may cause the adjacent electrically unconnected points heretofore mentioned to be at considerably different potentials, thereby possibly causing dangerous electrical oscillations between these two points.

It is an object of this invention to provide a circuit arrangement which reduces the danger of oscillations between points in the winding of an electrical inductive device which are physically adjacent but not directly connected electrically.

In accomplishment of this objective this invention provides a circuit in which a resistance having a negative resistance-voltage characteristic is used in such manner that potentials of the physically adjacent points heretofore mentioned are equalized on transient overvoltages with the electrical losses in the connecting resistor being held to a minimum.

The features of my invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 shows an electrical winding having points which are physically adjacent but not directly connected electrically; and in which Fig. 2 shows the said winding having the protective arrangement of this invention.

In the drawing Fig. 1 shows an electrical winding 1—6, comprising two sections, 1—3 and 4—6, which are on a common magnetic core (not shown). Section 1—3 is connected to section 4—6 by means of a conductor which runs from a point 2 intermediate of section 1—3, to point 4, the beginning of section 4—6. As will be seen, points 3 and 4, the terminal point of section 1—3, and the beginning point of section 4—6, respectively, are physically separated from each other and are not directly connected electrically, and may under certain circumstances be at considerably different potentials.

If a transient overvoltage is applied at point 1 of the winding by some means such as, for example, a stroke of lightning to a line connected to point 1, the adjacent points 3 and 4 may be at dangerously different potentials due to the abnormal voltage distribution within the winding, caused largely by the capacitive reactance of the winding to the high-frequency components of the transient voltage. This abnormal distribution of the transient voltage in the winding may possibly cause dangerous voltage oscillations between the physically adjacent points 3 and 4.

My solution to the problem of eliminating voltage oscillations between such adjacent unconnected points is shown in Fig. 2, which illustrates an embodiment of my invention. It will be noted that in order to reduce the stress between points 3 and 4 on transient overvoltage, I provide a connection between point 3 and point 5, with point 5 being intermediate points 4 and 6. Connected between points 3 and 5 is a resistance element R having a negative resistance-voltage characteristic.

By "negative resistance-voltage characteristic" is meant that the resistance of the element decreases when the voltage across or the current through it increases. This resistance element is preferably composed of a ceramic resistance material consisting of graphite and silicon carbide in the proportions and heat-treated in the manner described in McEachron Patent No. 1,822,742, granted September 8, 1931, and assigned to the same assignee. This material as manufactured by applicant's assignee bears the trade name "Thyrite." Its characteristic is defined by the equation $RI^a = C$ where R is its instantaneous resistance, I is the current through it, $a$ is an exponent (typically 0.7) which is determined by the proportions of its ingredients and the controls used in its manufacture, and C is a constant determined by the physical dimensions of the particular resistance element. Its resistance is substantially independent of frequency and temperature and its change in resistance occurs substantially instantaneously when its current and voltage change.

In determining the location of point 5, that is, the point to which point 3 on the winding is connected through the resistance element, it is important that the point 5 be so located as to make the steady-state voltage between points 4 and 5 equal to the steady-state voltage between points 2 and 3. With the voltages 2—3 and 4—5 respectively equal and opposite it will be seen that under normal steady-state conditions there is zero potential between points 2—4 and 3—5.

Hence, with the resistance element R connected between points 3 and 5 as shown, it will be seen that under ideal steady-state conditions there is no voltage drop across the resistor R and no current flow through the resistor due to any potential difference between points 3 and 5.

When a transient voltage of large magnitude is impressed on the winding due to a stroke of lightning, for example, the points 3 and 4 would ordinarily be at considerably different potentials. However, the conductor 3—5 provides a bypass or shunt around point 4, and, as has been previously explained, the negative resistance-voltage characteristic of resistance element R is such that the resistance of the element greatly decreases upon the impact of a high transient voltage, and provides a low resistance path between points 3 and 5, thus reducing the voltage stress between points 3 and 4.

While it might appear from an inspection of the winding circuit that the desired reduction of voltage stress between points 3 and 4 may be obtained merely by making a connection from 3 to 5, without using a resistance element in the line 3—5, such is not the case. Except under ideal circumstances, if the resistor is not included in the circuit, there is an unwanted steady-state flow of current in the section 2—3 of the winding. When the resistor is used this flow of current is held to a minimum under steady-state conditions.

However, a conventional resistance in line 3—5 is undesirable under the impact of a high transient voltage since it would permit a high potential difference between points 3 and 5, and would not aid in reducing the voltage stress between points 3 and 4. It will be seen, therefore, that the use of a resistance element having a negative resistance-voltage characteristic satisfies both steady-state and transient conditions. It has a resistance value sufficiently high under steady-state conditions to hold to a minimum the flow of undesired current through winding section 2—3, while under transient overvoltage conditions, the resistance value drops sufficiently low to prevent the establishment of an undesired potential difference between points 3 and 4.

While it has been known how to protect electrical windings by means of resistance elements having a negative resistance-voltage characteristic, my invention provides a new and more economical method of achieving the desired result than has been known heretofore. In the prior arrangements, when it was desired to eliminate dangerously high voltages between points 3 and 4, that is, the unconnected points on the winding, it has been customary to place the negative resistance-voltage characteristic resistor in parallel with the winding section 2—3.

In such case the number of resistor discs which is used is determined by the steady-state voltage between points 2 and 3, while in accordance with my invention the negative resistance is connected between two points 3—5 which are normally at the same potential, or, expressed in another way, have zero potential difference, in a balanced circuit 2—3—5—4.

It has been found in actual practice that the ordinary requirements are approximately one disc of negative resistance for each 300 volts, 60 cycles. Thus, for example, if the normal voltage between points 2 and 3 were of the order of 30,000 volts, as might very possibly be the case, approximately 100 discs would be required under the method heretofore in use to accommodate the ordinary steady-state voltage of the winding section 2—3. In one case which was studied the advantage of placing the negative resistance in circuit 2—3—5—4 as provided in this invention, rather than putting the negative resistance in parallel merely with section 2—3 of the winding, was shown by the fact that use of this invention reduced the calculated number of discs required in a specific case from 80 to 5.

It can readily be seen that there is a considerable advantage to be gained in reducing the number of negative resistance-voltage characteristic resistors required in a transformer protective circuit. In addition to the expense of the negative resistors themselves, reduction in the quantity of negative resistors used also saves valuable space inside the transformer tank, and eliminates the additional electrical loss consequent upon the use of the additional number of negative resistors. Thus, when the circuit of my invention is used, the necessary protection is accomplished with a minimum amount of negative resistor units or discs and, as has been shown, results in a considerable saving of money and space.

While there has been shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a stationary electrical induction device having a first winding section and a second winding section, said first winding section having a terminal physically adjacent a terminal of said second winding section, said two winding sections being electrically connected by a conductor connected from an intermediate point of said first winding section to said terminal of said second winding section, a protective arrangement to prevent the establishment of an excessive difference of potential between said physically adjacent terminals, comprising a resistance having a negative resistance-voltage characteristic connected between said terminal of said first winding section and an intermediate point of said second winding section so positioned that the difference of potential between said intermediate point of said first section and said terminal of said first section is normally substantially equal to the potential difference between said terminal of said second section and said intermediate point of said second section.

2. In a stationary electrical induction device having a first winding section and a second winding section, said first winding section having a terminal physically adjacent a terminal of said second winding section, said two winding sections being electrically connected by a conductor connected from an intermediate point of said first winding section to said terminal of said second winding section, a protective arrangement to prevent the establishment of an excessive difference of potential between said physically adjacent terminals, comprising a resistance having a negative resistance-voltage characteristic connected between said terminal of said first winding section and an intermediate point of said second winding section so positioned that the difference of potential between said intermediate point of said first section and said terminal of said first section is normally substantially equal to the potential difference between said terminal of said second section and said intermediate point of said second section, said resistance providing a low resistance path between the respective points on said winding sections to which it is connected upon the application of a transient voltage of high magnitude to said winding sections.

JAMES R. SUTHERLAND.

REFERENCES CITED

The following references are of record in the file of this patent:

UNITED STATES PATENTS

| Number | Name | Date |
| --- | --- | --- |
| 2,276,855 | Meador | Mar. 17, 1942 |